United States Patent [19]

Riccitelli

[11] Patent Number: 4,669,739
[45] Date of Patent: Jun. 2, 1987

[54] ROTARY MECHANICAL FLUID FACE SEAL WITH RIGID RESTRAINT RING MEANS

[75] Inventor: Constantino Riccitelli, Warwick, R.I.
[73] Assignee: EG&G Sealol, Inc., Cranston, R.I.
[21] Appl. No.: 911,977
[22] Filed: Sep. 26, 1986
[51] Int. Cl.⁴ .......................... F16J 15/36; F16J 15/38
[52] U.S. Cl. ........................................ 277/89; 277/87; 277/93 SD
[58] Field of Search ................... 277/87–90, 277/93 R, 93 SD, 96 R

[56] References Cited

U.S. PATENT DOCUMENTS

| | | | |
|---|---|---|---|
| 2,758,856 | 8/1956 | Payne et al. | 277/87 |
| 2,984,505 | 5/1961 | Andresen et al. | 277/88 X |
| 3,194,569 | 7/1965 | Utvitch | 277/88 |
| 3,391,942 | 7/1968 | Wilson | 277/96.2 X |

Primary Examiner—Robert S. Ward
Attorney, Agent, or Firm—Finnegan, Henderson, Farabow, Garrett and Dunner

[57] ABSTRACT

A seal assembly for sealing a rotatable shaft to a housing includes a flexible bellows member and a removeable insert which are sealed against each other along complementary tapered sealing surfaces. A rigid restraint is located in the flexible bellows member so as to be isolated from corrosive fluid contained by the bellows to stabilize the sealing area of the sealing surfaces and prevent expansion in that area.

11 Claims, 5 Drawing Figures

ROTARY MECHANICAL FLUID FACE SEAL WITH RIGID RESTRAINT RING MEANS

BACKGROUND OF THE INVENTION

1. Field of the Invention

The present invention relates to rotary mechanical fluid seals of the type used for effecting a fluid-tight seal between a rotatable shaft and a housing. In particular, this invention relates to a reinforced two-member seal assembly which rotates with the shaft and in which one member is a replaceable insert which is resiliently pressed in an axial direction against a stationary surface on the housing. Such seals are used to contain corrosive fluids.

2. Description of the Prior Art

The present invention is an improvement over the rotary mechanical fluid seal disclosed in U.S. Pat. No. 3,391,942, which is incorporated hereby by reference. The prior ar device of the '942 patent is shown in FIGS. 1-3 to include a bellows member 10 having one end 12 clamped by a clamp ring 13 in fixed sealing relationship with a rotatable shaft 14 and the second end 16 fixed in sealing relationship with one portion 18 of a replaceable insert 20. Screws 21 are used to tighten clamp ring 13 around shaft 14. A second portion 22 of replaceable insert 20 rotates against a sealing surface 24 on a housing 26. The radially inner surface of the second end 16 of bellows member 10 is provided with a rigid restraining ring 28 for rigidifying the end of bellows member 10 which is in contact with replaceable insert 20. Second end 16 of bellows member 10 and replaceable insert 20 are biased toward sealing surface 24 by a cylindrical member 30 and springs 32 so that second portion 22 of replaceable insert 20 is in tight sealing contact with sealing surface 24 of housing 26.

Although this arrangement represented a considerable improvement over the then prior art, there were some disadvantages with this design. Since seals of this nature are used to contain corrosive liquids, the composition of the restraining ring is limited to materials which are resistant to the corrosive fluid with which it comes in contact. Unfortunately metal rings have not been corrosion resistant in the design shown in the '942 patent. This limitation cuuses the seal design to be constrained by dimensional and structural configurations which would not be occasioned if a metal ring were useable in a corrosive environment. In addition, the arrangement shown in the prior art has been known to incur premature weakening of the bellows member and, therefore, requires replacement of the bellows member upon wear and relacement of the replaceable insert. Besides the obvious additional cost of replacing both members, it is considerably more time-consuming and inefficient to remove and replace the bellows member each time that the replaceable insert is removed and replaced.

Accordingly, it is an object of this invention to provide a rotary mechanical fluid seal with a replaceable insert in which the composition of the restraining ring is not limited to materials which are resistant to corrosive fluids being contained by the seal.

It is another object of this invention to provide a seal design which is not constrained by dimensional and structural configurations of prior art devices.

It is a further object of this invention to provide a seal design which does not incur premature weakening of the bellows member and, therefore, does not require replacement of the bellows member upon wear and replacement of the replaceable insert.

Additional objects and advantages will be set forth in the description which follows and in the drawings, and in part will be obvious from the description of the invention or may be learned by practice of the invention. The objects and advantages of the invention may be realized and obtained by means of the instrumentalities and combinations particularly pointed out in the appended claims.

SUMMARY OF THE INVENTION

To achieve the foregoing objects, and in accordance with the purposes of the invention as embodied and broadly described herein, a seal assembly is provided for sealing a rotatable shaft to a housing which has a sealing surface surrounding the shaft and for defining a cavity for containment of fluid, the sealing assembly comprising: a first member having a first end, a second end, and an intermediate portion flexibly interconnecting the first and second ends, the first end adapted for sealing contact with the shaft, the intermediate portion extending, when assembled on the shaft, axially along the shaft toward the sealing surface of the housing to form an annular cavity around the shaft, and the second end having a first sealing surface; a second member for forming a seal between the first sealing surface of the first member and the sealing surface of the housing, the second member having a second sealing surface for sealing contact with the first sealing surface of the first member, and having a third sealing surface for sealing contact with the sealing surface of the housing; and rigid restraint ring means for rigidifying the second end of the first member to maintain the first sealing surface of the first member in position against the second sealing surface of the second member, the restraint ring means located in contact with a portion of the second end of the first member which is separated from the cavity by the first sealing surface, whereby the restraint ring means is isolated from any fluid in the cavity.

The intermediate portion of the first member is preferably a bellows. In addition, the second end of the first member preferably includes an axial face with groove means for accommodating the restraint ring means, and the first sealing surface of the first member is preferably an inner radial surface located radially inward of the groove means. The second sealing surface is preferably an outer radial surface which is tapered at an angle from the longitudinal axis of the seal. The first sealing surface of the first member is also preferably tapered at an angle from the longitudinal axis of the seal. In addition, the length of the second sealing surface is approximately the full axial length of the second end of the first member.

BRIEF DESCRIPTION OF THE DRAWINGS

The accompanying drawings, which are incorporated in, and constitute a part of the specification, illustrate a preferred embodiment of the invention and, together with the general description of the invention given above and the detailed description of the preferred embodiment given below, serve to explain the principles of the invention.

DETAILED DESCRIPTION OF THE PREFERRED EMBODIMENT

Reference will now be made in detail to the presently preferred embodiment of the invention as illustrated in the accompanying drawings.

Figure 1:
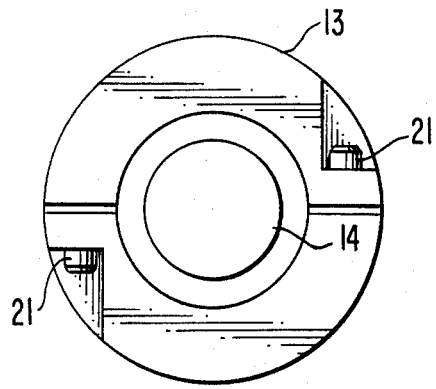
FIG. 1 is an elevational view of one end of a prior art device.
Figure 2:
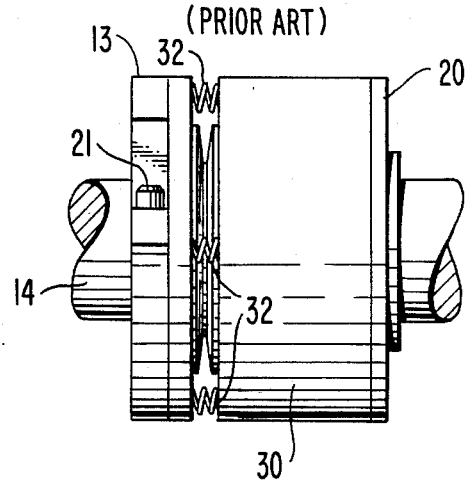
FIG. 2 is a side elevational view of the prior art device of FIG. 1.
Figure 3:
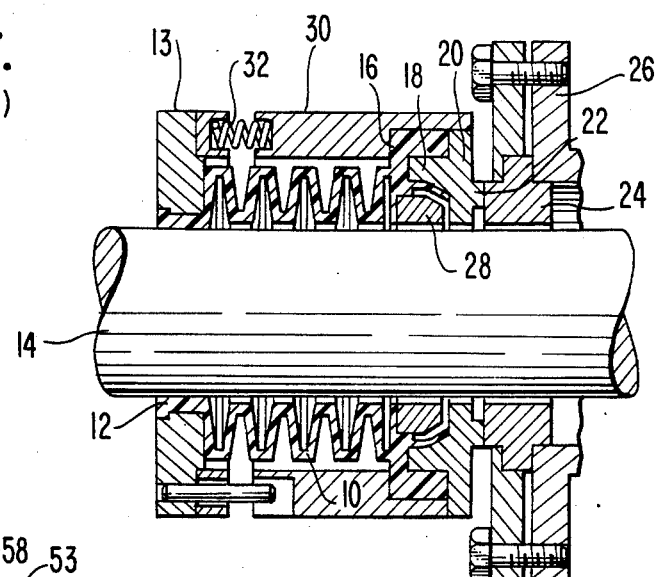
FIG. 3 is a side elevational view in section of the prior art device of FIG. 1.
Figure 4:
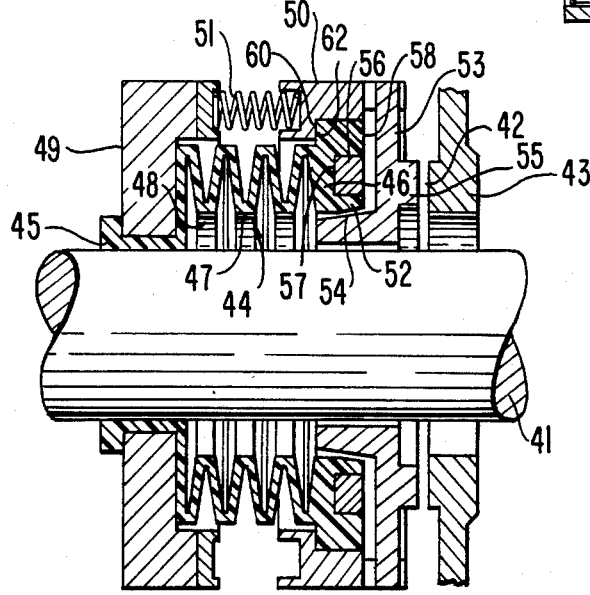
FIG. 4 is a side elevational view in section of the preferred embodiment of the present invention.

As best seen in FIG. 4, a seal assembly is shown which seals a rotatable shaft 41 to a sealing surface 42 of a housing 43 surrounding shaft 41. The seal assembly comprises a first bellows member 44 having a first end 45, a second end 46, and an intermediate portion 47 extending axially from first end 45 along shaft 41 towards sealing surface 42 of housing 43 with intermediate portion 47 terminating at second end 46 of first member 44. First member 44 thereby defines an annular cavity 48 around shaft 41.

First end 45 extends axially along shaft 41 in a sleeve arrangement which can be easily clamped to shaft 41 by clamp ring 49. Intermediate portion 47 preferably comprises an axially expandable bellows portion which allows second end 46 of first member 44 to be adjustable spaced from first end 45.

Biasing member 50 is axially spaced and biased from clamp ring 49 by biasing means such as a plurality of circumferentially spaced coil springs 51. Biasing member 50 has a first shoulder 60 which fits against a shoulder 62 on second end 46 of first member 44 to bias second end 46 of first member 44 axially away from clamp ring 49.

Figure 5:
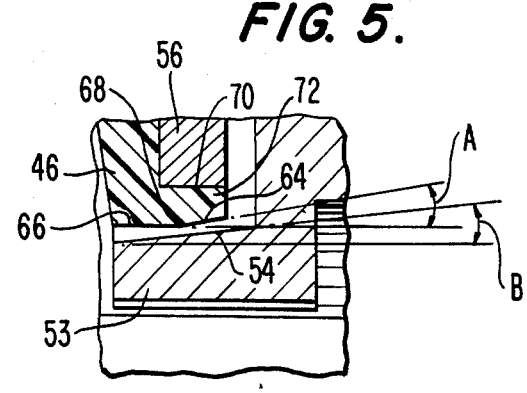
FIG. 5 is a detail of the arrangement shown in FIG. 4.

Second end 46 has a first sealing surface 52 on a radially inner portion. First sealing surface 52 preferably has a tapered portion 64 which is tapered from the axis of shaft 41 by an angle A, shown in FIG. 5, of approximately 6 degrees and less tapered or untapered portion 66. Tapered portion 64 and untapered portion 66 converge at a circumferential sealing point 68 which provides sealing contact between first sealing surface 52 and second sealing surface 54.

The seal assembly is also provided with a second member 53 comprising a sealing ring which is a replaceable insert that can be attached to second end 46 of first member 44. Second member 53 has a second sealing surface 54 provided on a radially outer surface. This arrangement provides for assembly and sealed mating contact of first sealing surface 52 of first member 44 with second sealing surface 54 of second member 53. Second sealing surface 54 is tapered at an angle B, shown in FIG. 5, of approximately 5 degrees from the axis of shaft 41 to provide a suitable mating surface for first sealing surface 52 of first member 44. The shallow angle configuration provides wedge-type retention and allows second member 53 to be removable and replaceable from second end 46 of first member 44.

Second member 53 is also provided with a third sealing surface 55 for sealing contact with sealing surface 42 of housing 43 so that these two sealing surfaces rotate relative to each other while maintaining a fluid seal. Third sealing surface 55 of second member 53 is biased against sealing surface 42 of housing 43 because it is connected to biasing member 50 through second end 46 of first member 44 as described above.

A rigid restraint ring means 56 is provided in a groove 57 in the outer axial surface 58 of second end 46 to rigidify the second end and maintain first sealing surface 52 against second sealing suface 54. The radially inner portion 70 of restraint ring means 56 confines the radially inner portion 72 of second end 46 from outward radial expansion during use and, together with the complementary tapers of first sealing surface 52 and second sealing surface 54, maintains a constant seal between those two sealing surfaces during use. This seal between surfaces 52 and 54, and the location of ring 56 beyond this seal, allows restraint ring 56 to be isolated from the corrosive fluid in annular cavity 48 throughout use and permits substantial longevity of first member 44 despite numerous replacements of second member 53.

The composition of first member 44 and second member 53 are conventional corrosion-resistant materials. However, restraint ring means 56 may be made of a high-strength material such as stainless steel which would otherwise be corroded by the fluid in the cavity 48 except that it is isolated from the corrosive fluid by the assembly of first sealing surface 52 and second sealing surface 54. The use of stainless steel or similar materials allows for advantageous design and operation of the inventive device.

Having shown and described the preferred embodiment of the present invention by way of example, it should be realized that structural changes could be made and other examples given without departing from either the spirit or scope of the invention as defined in the following claims.

What is claimed is:

1. A seal assembly for sealing a rotatable shaft to a housing which has a sealing surface surrounding the shaft and for defining a cavity for containment of fluid, said sealing assembly comprising:

a first member having a first end, a second end, and an intermediate portion flexibly interconnecting said first and second ends, said first end adapted for sealing contact with said shaft, said intermediate portion extending, when assembled on said shaft, axially along said shaft toward said sealing surface of said housing to form an annular cavity around said shaft, and said second end having a first sealing surface;

a second member for forming a seal between the first sealing surfaces of said first member and said sealing surface of said housing, said second member having a second sealing surface for sealing contact with said first sealing surface of said first member, and having a third sealing surface for sealing contact with said sealing surface of said housing; and rigid restraint ring means for rigidifying said second end of said first member to maintain said first sealing surface of said first member in position against said second sealing surface of said second member, said restraint ring means located in contact with a portion of said second end of said first member which is separated from said cavity by said first sealing surface, whereby said restraint ring means is isolated from any fluid in said cavity.

2. A seal assembly as claimed in claim 1 wherein said intermediate portion is a bellows.

3. A seal assembly as claimed in claim 1 wherein said second end includes an axial face with groove means for accommodating said restraint ring means.

4. A seal assembly as claimed in claim 3 wherein said first sealing surface is an inner radial surface located radially inward of said groove means.

5. A seal assembly as claimed in claim 4 wherein said second sealing surface is an outer radial surface.

6. A seal assembly as claimed in claim 5 wherein said second sealing surface is tapered at an angle from the longitudinal axis of the seal.

7. A seal assembly as claimed in claim 5 wherein at least a portion of said first sealing surface is tapered at an angle from the longitudinal axis of the seal.

8. A seal assembly as claimed in claim 6 wherein the angle of taper of said second sealing surface is approximately 5 degrees.

9. A seal assembly as claimed in claim 7 wherein the angle of taper of said first sealing surface is approximately 6 degrees.

10. A seal assembly as claimed in claim 5 wherein the length of said second sealing surface is approximately the full axial length of the second end.

11. A seal assembly for sealing a rotatable shaft to a housing which has a sealing surface surrounding the shaft and for defining a cavity for containment of fluid, said sealing assembly comprising:

a first member having a first end, second end, and an intermediate bellows portion extending, when assembled on said shaft, axially along said shaft towards said sealing surface of said housing to form an annular cavity around said shaft, and said second end having a first sealing surface, at least a portion of said first sealing surface tapered at an angle from the longitudinal axis of the seal;

a second member for forming a seal between the first sealing surface of said first member and said sealing surface of said housing, said second member having a second sealing surface for sealing contact with said first sealing surface of said first member, said second sealing surface tapered at an angle from the longitudinal axis of the seal, and having a third sealing surface for sealing contact with said sealing surface of said housing;

rigid restraint ring means for rigidifying said second end of said first member to maintain said first sealing surface of said first member in position against said second sealing surface of said second member, said restraint ring means located in contact with a portion of said second end of said first member which is separated from said cavity by said first sealing surface, whereby said restraint ring means is isolated from any fluid in said cavity;

a clamp ring means for clamping the first end of the first member to said shaft;

a biasing member axially spaced from said clamp ring means for contact with the second end of the first member; and biasing means positioned between said clamp ring means and said biasing member for biasing said biasing member axially away from said clamp ring means so that said second end of said first member is biased away from said clamp ring means and into sealing contact with said second member whereby said first sealing surface is biased in contact with said second sealing surface and said second sealing surface is biased in contact with said sealing surface surrounding the shaft.

* * * * *